United States Patent
Botros et al.

(10) Patent No.: US 10,037,521 B1
(45) Date of Patent: Jul. 31, 2018

(54) BACKGROUND COMMUNICATION FAILOVER FOR MOBILE PAYMENTS

(71) Applicant: Square, Inc., San Francisco, CA (US)

(72) Inventors: Paul Abraham Botros, San Francisco, CA (US); Syam Sundar Puranam, San Francisco, CA (US); Anjan Kumar B. Karanam, San Francisco, CA (US); Jonathan Andrew Wolter, San Francisco, CA (US); Rong Xu, San Francisco, CA (US); Dennis Webb, Jr., Pacifica, CA (US)

(73) Assignee: Square, Inc., San Francisco, CA (US)

( * ) Notice: Subject to any disclaimer, the term of this patent is extended or adjusted under 35 U.S.C. 154(b) by 574 days.

(21) Appl. No.: 14/495,390

(22) Filed: Sep. 24, 2014

(51) Int. Cl.
| | | |
|---|---|---|
| *G06Q 20/30* | (2012.01) | |
| *G06Q 20/32* | (2012.01) | |
| *G06Q 20/20* | (2012.01) | |
| *G06Q 20/40* | (2012.01) | |
| *G06Q 20/34* | (2012.01) | |
| *H04W 40/20* | (2009.01) | |
| *H04M 7/00* | (2006.01) | |

(52) U.S. Cl.
CPC ........ *G06Q 20/204* (2013.01); *G06Q 20/3255* (2013.01); *G06Q 20/353* (2013.01); *G06Q 20/4097* (2013.01)

(58) Field of Classification Search
CPC .... G06Q 20/34; G06Q 20/204; G06Q 20/209; G06Q 20/322; G06Q 20/3224; G06Q 20/3255; G06Q 20/18; G06Q 20/20; H04M 7/0057; H04M 2207/12; H04M 7/0036; H04M 7/126; H04L 41/0663; H04L 69/40
See application file for complete search history.

(56) References Cited

U.S. PATENT DOCUMENTS

| | | | | |
|---|---|---|---|---|
| 6,693,897 B1* | 2/2004 | Huang | ................ | H04M 1/6505 370/352 |
| 6,975,717 B1* | 12/2005 | Smith | ................ | H04M 7/0057 379/221.01 |
| 6,980,638 B1* | 12/2005 | Smith | ................ | H04M 7/0057 379/221.01 |
| 7,092,380 B1* | 8/2006 | Chen | ................ | H04L 29/06027 370/352 |
| 7,466,689 B1* | 12/2008 | Halpern | ................ | H04L 12/66 370/352 |
| 7,835,942 B1* | 11/2010 | Pavlic | ................ | G06Q 20/04 705/16 |

(Continued)

*Primary Examiner* — Florian M Zeender
*Assistant Examiner* — Dana Amsdell
(74) *Attorney, Agent, or Firm* — Lee & Hayes, PLLC

(57) ABSTRACT

A mobile point-of-sale terminal includes a payment card reader having a card interface configured to read data from a payment card and transmit the payment card data, along with other transaction information, via a non-internet communication channel to a payment processing system to process the point-of-sale transaction. The mobile point-of-sale terminal may be configured to run a register application configured to receive transaction information, including payment card information from the payment card reader, determine whether an internet connection is available, and, if an internet connection is not available, transmit the transaction information to the payment processing system using a non-internet communication channel.

20 Claims, 8 Drawing Sheets

(56) References Cited

U.S. PATENT DOCUMENTS

| | | | | |
|---|---|---|---|---|
| 8,223,951 B1* | 7/2012 | Edelhaus | ............. | G06Q 10/107 379/115.01 |
| 8,494,478 B1* | 7/2013 | Ponnangath | ........ | G06F 11/1464 455/343.1 |
| 8,868,859 B2* | 10/2014 | Schmidt | ............. | G06F 11/1469 707/679 |
| 8,964,533 B2* | 2/2015 | Moore | ............... | H04L 41/0663 370/221 |
| 2006/0034255 A1* | 2/2006 | Benning | ............... | G08B 25/08 370/352 |
| 2006/0039290 A1* | 2/2006 | Roden | .............. | H04L 29/06027 370/241 |
| 2007/0274291 A1* | 11/2007 | Diomelli | ......... | H04L 51/36 370/352 |
| 2007/0280288 A1* | 12/2007 | Ma | ...................... | H04M 1/2535 370/467 |
| 2010/0267390 A1* | 10/2010 | Lin | ......................... | H04L 51/38 455/445 |
| 2011/0084140 A1* | 4/2011 | Wen | ....................... | G06Q 20/32 235/449 |
| 2011/0128954 A1* | 6/2011 | Veenstra | ............. | H04Q 3/0045 370/352 |
| 2012/0265697 A1* | 10/2012 | Tuchman | ............. | G06Q 30/016 705/304 |
| 2012/0311280 A1* | 12/2012 | Schmidt | ............. | G06F 11/1469 711/162 |
| 2013/0155842 A1* | 6/2013 | Moore | ............... | H04L 41/0663 370/221 |
| 2014/0098671 A1* | 4/2014 | Raleigh | .............. | H04L 41/5003 370/235 |
| 2015/0095453 A1* | 4/2015 | Jain | ........................ | H04L 65/80 709/217 |
| 2015/0371216 A1* | 12/2015 | Olawale | ................ | G06Q 20/34 705/39 |
| 2016/0007240 A1* | 1/2016 | Belghoul | .............. | H04W 76/27 370/331 |

* cited by examiner

BACKGROUND COMMUNICATION FAILOVER FOR MOBILE PAYMENTS

BACKGROUND

Mobile payment systems allow individuals and merchants to accept debit and credit cards on their smartphone, tablet, or other mobile computing device. Some mobile payment systems include a payment card reader that reads and transmits payment card information to a connected mobile computing device. The mobile computing device then transmits the payment card information and other transaction information to a payment processing system to be processed. Typically, this information is transmitted over an internet connection and stored for later batch transmission if an internet connection is not available.

BRIEF DESCRIPTION OF THE DRAWINGS

The techniques described herein are illustrated by way of example, and not by way of limitation, in the figures of the accompanying drawings, in which like reference numerals are used to refer to similar elements.

The figures depict various embodiments of the techniques described herein for purposes of illustration only. It should be readily recognized from the following discussion that alternative embodiments of the structures and methods illustrated herein may be employed without departing from the principles of the techniques described herein.

DETAILED DESCRIPTION

Example embodiments described herein include techniques and hardware arrangements for background communication failover for a mobile point-of-sale terminal in the event an internet connection is not available. More specifically, a mobile computing device running a register application configured to facilitate a point-of-sale transaction between a merchant and a buyer allows for the transaction information to be communicated over a non-internet communication channel if it is determined that an internet connection is not available. The non-internet communication channel may be a voice call, SMS message, MMS message, or another telecommunications messaging service.

Moreover, the techniques and hardware described herein include arrangements for conducting card-present, point-of-sale transactions using a mobile telephone or computing device that is not capable of running a register application. For example, the techniques allow for a merchant with a mobile computing device that is not supported by a payment processing system service provider to conduct point-of-sale transactions using the payment processing system. Additionally, the techniques introduced herein allow a merchant without a smartphone or internet capable device to conduct point-of-sale transactions using the payment processing system via a voice call.

Figure 1:
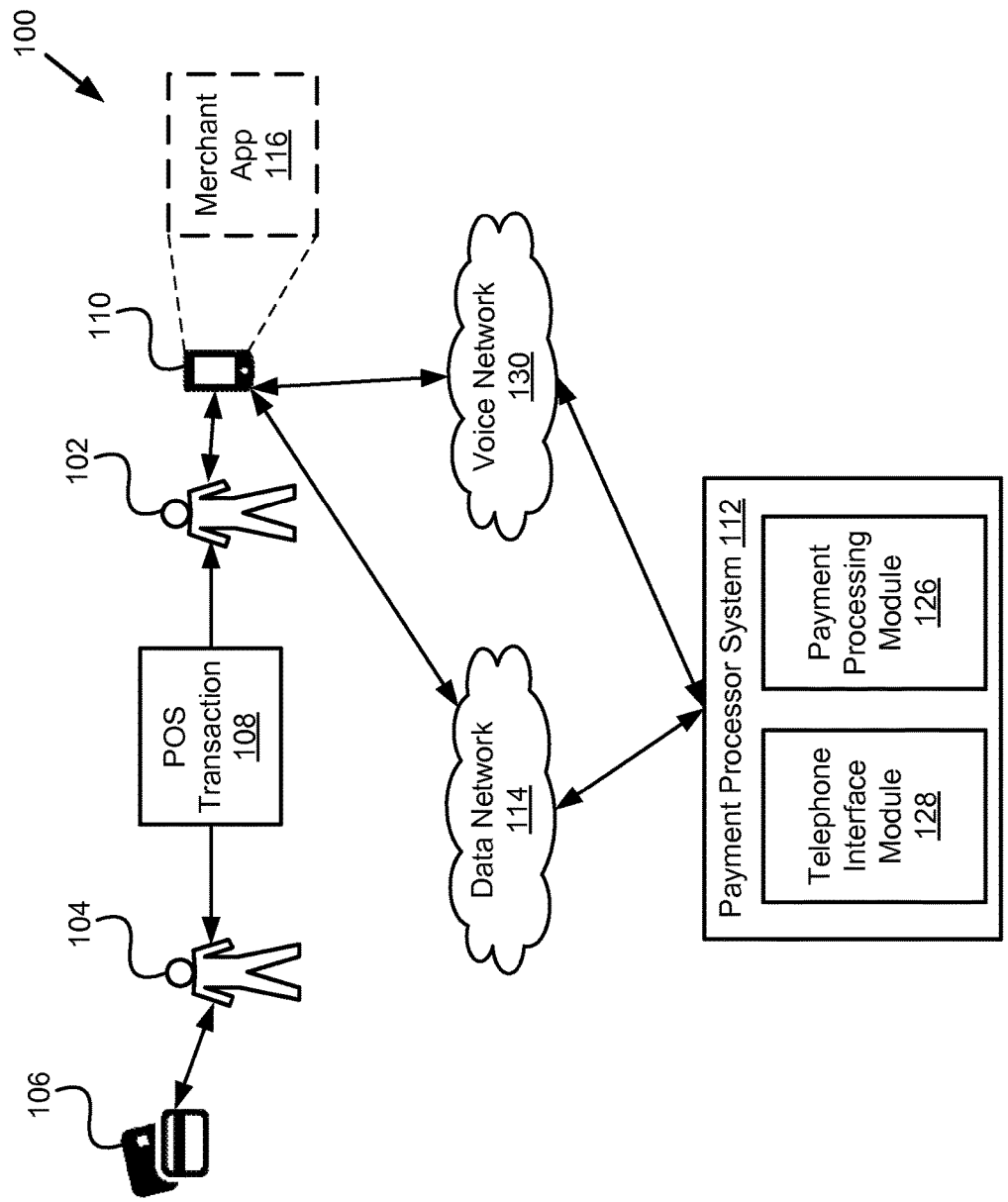
FIG. 1 illustrates an example architecture of a payment communication system for enabling transactions between merchants and buyers.

FIG. 1 illustrates an example architecture of a payment communication system 100 for enabling transactions between merchants 102 and buyers 104. In the example of FIG. 1, a buyer 104 may use any of a variety of payment cards 106 when participating in a point-of-sale (POS) transaction 108 with a merchant 102. In some embodiments, the payment cards 106 may include one or more magnetic stripes for providing payment card and buyer information when swiped in a card reader. In other embodiments, other types of payment cards may be used, for example smart cards having a built in integrated circuit including a memory chip, a radio frequency identification tag, and the like.

The payment communication system 100 in the example of FIG. 1 illustrates a merchant device 110 associated with the merchant 102 that participates in the payment service provided by a service provider. The merchant device 110, as discussed elsewhere herein, may be any appropriate device configured to send and receive requests, messages, voice calls or other types of information over the data network 114 or the voice network 130. In some embodiments the merchant device 110 may be a computing device (e.g. a mobile computing device) such as a smartphone or a tablet. In some embodiments, the merchant device 110 could be any device with a cellular connection and a communication port, such as an audio input/output port.

Each merchant device 110 may optionally include an instance of a merchant application 116 executed on the merchant device 110. The merchant application 116 may provide POS functionality to enable the merchant 102 to accept payments at a POS location using the merchant device 110. The merchant application 116 on the merchant device 110 may send transaction information via data network 114 (e.g., the internet) to the payment processor system 112, e.g., as the transaction is being conducted at the POS location. As further explained in reference to FIG. 6, the transaction information may include information regarding the time, place, and the amount of each respective transaction, information related to the item acquired, payment card information, as well as additional information, such as buyer information. In some embodiments, the transaction information may be sent using a non-internet connection through voice network 130 if, for example, a particular merchant device 110 is not connected to the data network 114.

As depicted in FIG. 1, the merchant device 110 may communicate with the payment processor system 112 via a data network 114 or through a voice network 130. As discussed in greater detail herein, the networks 114 and 130 may be coupled with or include portions of a telecommunications network for sending data and/or making voice calls using a variety of different communication protocols.

In some embodiments, a particular merchant device 110 may not have access to the internet through a suitable data network 114, but may still have communication capabilities through a voice network 130. The merchant device 110 may communicate via the voice network 130 using short messaging service (SMS), multimedia messaging service (MMS), or a voice call. For example, the voice network 130 may be a cellular communication network.

The payment processor system 112 enables a service provider to provide a payment service in which merchants 102 are able to conduct POS transactions 108 with a plurality of buyers 104, such as for selling services and/or products to the buyers 104. The payment processor system 112 may include a payment processing module 126 that receives transaction information for processing payments made through a merchant application 116. The payment processor system 112 may also include a telephone interface module 128 that communicates with a merchant device 110 via the voice network 130. In some embodiments, the payment processor system 112 may be capable of performing certain tasks optionally performed by the merchant application 116, such as communicating with a card reader, decrypting financial information received from the card reader, accepting input from the merchant 102, providing instructions to the merchant 102, and allowing the merchant 102 to manage the merchant's account and preferences. The payment processor system 112 and its components are described in further detail in reference to FIGS. 6 and 8.

In some embodiments, the merchant application 116 may be configured to determine whether there is an internet connection via the data network 114 and communicate transaction information with the payment processor system 112 via a non-internet communication channel if there is no internet connection. Communication via the non-internet communication channel may occur in the background, without user input, as a failover if internet communication via the data network 114 fails. In some embodiments, the merchant application 116 may be configured such that the merchant 102 may set preferences regarding how to proceed when communication via the data network 114 fails. For example, the merchant application 116 may include settings to define whether the merchant application 116 should automatically send the transaction information via a non-internet communication channel, a preference for which non-internet communication channel is used to transmit the transaction information, and/or whether the merchant application 116 requests approval from the merchant 102 to send the transaction via the non-internet communication channel each time communication via the data network 114 fails.

In one embodiment, the non-internet communication channel is one or more SMS messages. If there is no internet connection, the merchant application 116 may transmit the transaction information via one or more SMS messages to the payment processor system 112. Additionally, the merchant application 116 may encrypt the transaction information prior to transmitting the one or more SMS messages. In some embodiments, the merchant application 116 may receive one or more SMS messages including a response from the payment processor system 112 indicating the status of the payment (e.g., approved, declined, or the like). In some embodiments, each SMS message may include various headers and/or footers to provide context to the messages.

In another embodiment, the merchant application 116 may be configured to communicate with the payment processor system 112 via MMS message. In various embodiments, the transaction information may be encoded in the form of an image, an audio file, or other format communicable via MMS. The payment processor system 112 may transmit a response to the merchant application 116 in an MMS message communicating a payment status. If the message is encoded in an image, audio file, or the like, the merchant application 116 may decode the message and present the payment status to the merchant 102.

In some embodiments, the non-internet channel is a voice call established between the merchant device 110 and the payment processor system 112. The merchant application 116 may be configured to initiate the voice call and communicate the transaction information in an audio signal. The audio signal may be in the form of tones, recognizable letters, words, symbols, or any other suitable audio transmission. In some embodiments the merchant application 116 may seamlessly place a voice call, communicate the transaction information and payment confirmation via audio, and terminate the voice call in the background without additional input from the merchant 102. In some embodiments the merchant application 116 may be configured to request approval from the merchant 102 to make the voice call. The card reader (not shown) or the merchant application 116 may be configured to store the transaction information to be sent via the voice call, so the merchant 102 does not need to re-swipe the card when the primary method of communication fails. In some embodiments, the merchant application 116 may prompt the merchant 102 to dial a specific phone number, enter certain information, and swipe or re-swipe the payment card in the card reader. In some embodiments, the card reader or the merchant application 116 may be configured to receive a specific audio signal from the payment processor system 112 and, in response to the specific audio signal, automatically send an audio signal comprising the transaction information for the previously swiped payment card to the payment processor system 112.

In some embodiments, the merchant device 110 may not include an instance of the merchant application 116. However, the merchant may still desire to use services, including a card reader, provided by the provider of the payment processor system 112. This situation may occur, for example, when the operating system of the merchant device 110 is not supported by the merchant application 116, the merchant device 110 is not capable of installing third-party applications, or the merchant 102 does not have cellular data service through the merchant's cellular service provider. In these circumstances, when the merchant application 116 is not present on the merchant device 110, the payment communication system 100 may still allow a merchant device 110 to communicate the transaction information to the payment processor system 112 via a voice call.

In some embodiments, the payment processor system 112 may be configured such that the merchant 102 may be allowed to manually initiate a voice call to communicate the transaction information. For example, the telephone interface module 128 of the payment processor system 112 may be connected to via a telephone number entered by the merchant 102 on the merchant device 110. Once a voice call is established, the payment processor system 112 may convey certain prompts containing instructions to the merchant 102. For example, the payment processor system 112 may prompt the merchant 102 to enter numbers on a keypad of the merchant device 110 or speak certain information, such as a payment amount, a merchant pin number, or item identification information 110. In some embodiments, the payment processor system 112 may communicate these prompts via an audio format which may be recognized by the merchant 102. In some embodiments, the payment processor system 112 may communicate the prompts via an audio signal recognizable by a card reader attached to the audio input/output port of the merchant device 110. The card reader could then play an audio message, display a message on a screen, or illuminate one or more lights providing instructions to the merchant or indicating the status of the payment. In other embodiments, the card reader does not include capability to provide output to the user and user interaction takes place via the merchant device 110.

To accept electronic payments for POS transactions, the merchant 102 may create a merchant account on the payment processor system 112 by providing information describing the merchant 102, including, for example, merchant name, contact information (e.g., telephone numbers, the merchant's address, and one or more financial accounts to which funds collected from buyers will be deposited). In some embodiments, the payment processor system 112 may store the phone number for a merchant device 110, which the payment processor system can use to recognize the merchant device 110 in order to recognize a merchant, authenticate the merchant and/or provide payment to the appropriate merchant.

The payment processor system 112 enables a service provider to provide a payment service in which merchants 102 are able to conduct POS transactions 108 with a plurality of buyers 104, such as for selling services and/or products to the buyers 104. The payment processor system 112 includes a payment processing module 126 that receives transaction information for processing payments made through the merchant application 116.

In some embodiments, the payment processor system 112 may include a telephone interface module 128, which is capable of receiving and processing communication via voice network 130. For example, the telephone interface module 128 may receive voice phone calls, process audio received via the voice calls, communicate information with the other parts of the payment processor system 112 (e.g. the payment processing module 126), and communicate audio information via a voice call with a merchant device 110. In some embodiments, the telephone interface module 128 may be configured to receive and process SMS and/or MMS messages, communicate information received from the messages with the payment processing module 126, and send SMS, MMS, or the like to the merchant device 110 to indicate payment status or other messages.

In some embodiments, the telephone interface module 128 may communicate with a merchant device 110 via a public switched telephone network (PSTN), voice-over-internet protocol (VoIP) connection, etc. The telephone interface module 128 may be capable of communicating with the merchant device 110 over a cellular or land based phone line and may communicate with other parts of the payment processor system 112, such as the payment processing module 126, via a data connection (e.g. Ethernet, USB, Wi-Fi, etc.). In one embodiment, a bus communicatively couples the components of the payment processor system 112. The bus may include one or more buses including an industry standard architecture (ISA) bus, a peripheral component interconnect (PCI) bus, a universal serial bus (USB), or some other bus known in the art to provide similar functionality.

In some embodiments, the card reader, merchant device 110, merchant application 116, and/or the payment processor system 112 (e.g. the telephone interface module 128), may include hardware or software for encrypting the transaction information. This encryption may be particularly important for transaction information communicated over voice network 130, such as via SMS, MMS, or voice call. For example, the card reader may read data from a payment card and encrypt it before communicating the data through the audio port to a merchant device 110. In some embodiments the card reader may be capable of decrypting information received, such as payment confirmation or rejection. In some embodiments, the merchant application 116 may encrypt the transaction information received from a card reader prior to sending it via either the data network 114 or the voice network 130. In some embodiments, the merchant application 116 and/or card reader may be configured to periodically exchange encryption keys with the payment processor system 112 in order to maintain information security.

Figure 2:
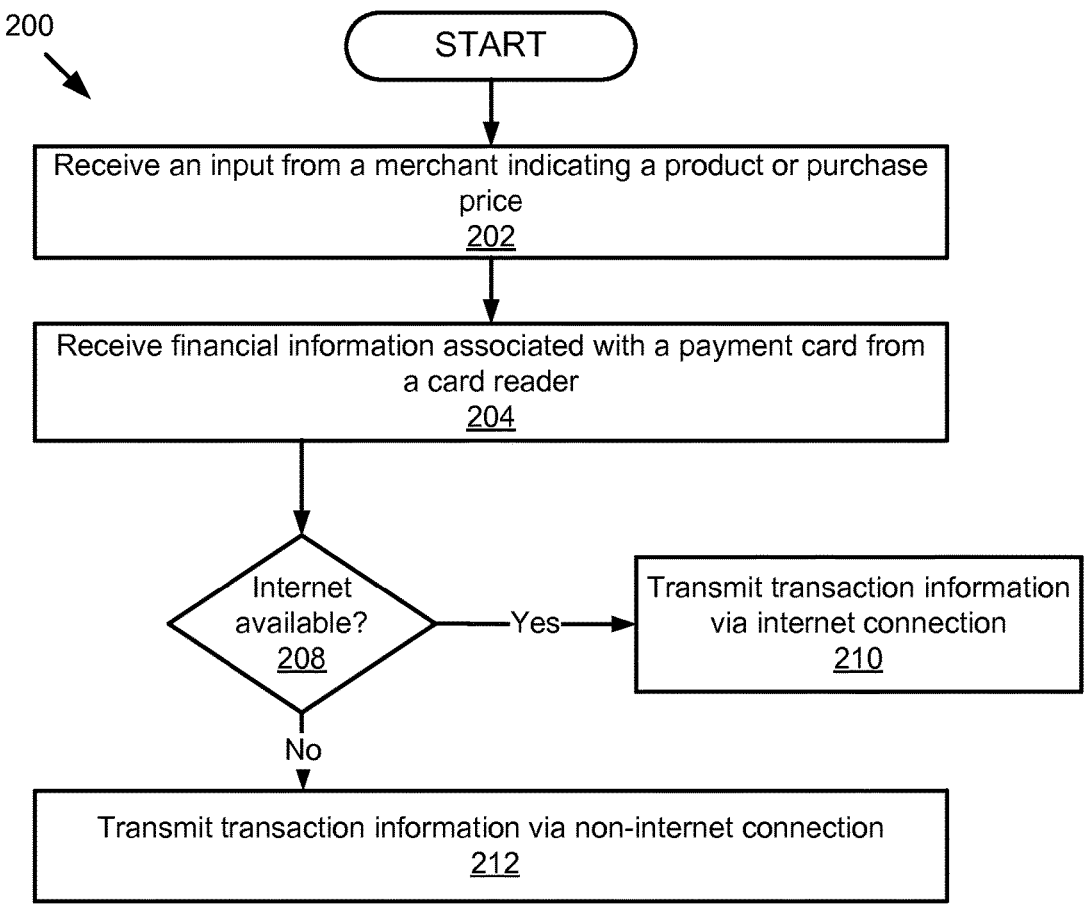
FIG. 2 is a flow diagram of an example process for selecting the appropriate means of communication between a merchant device and a payment processor system.
Figure 3:
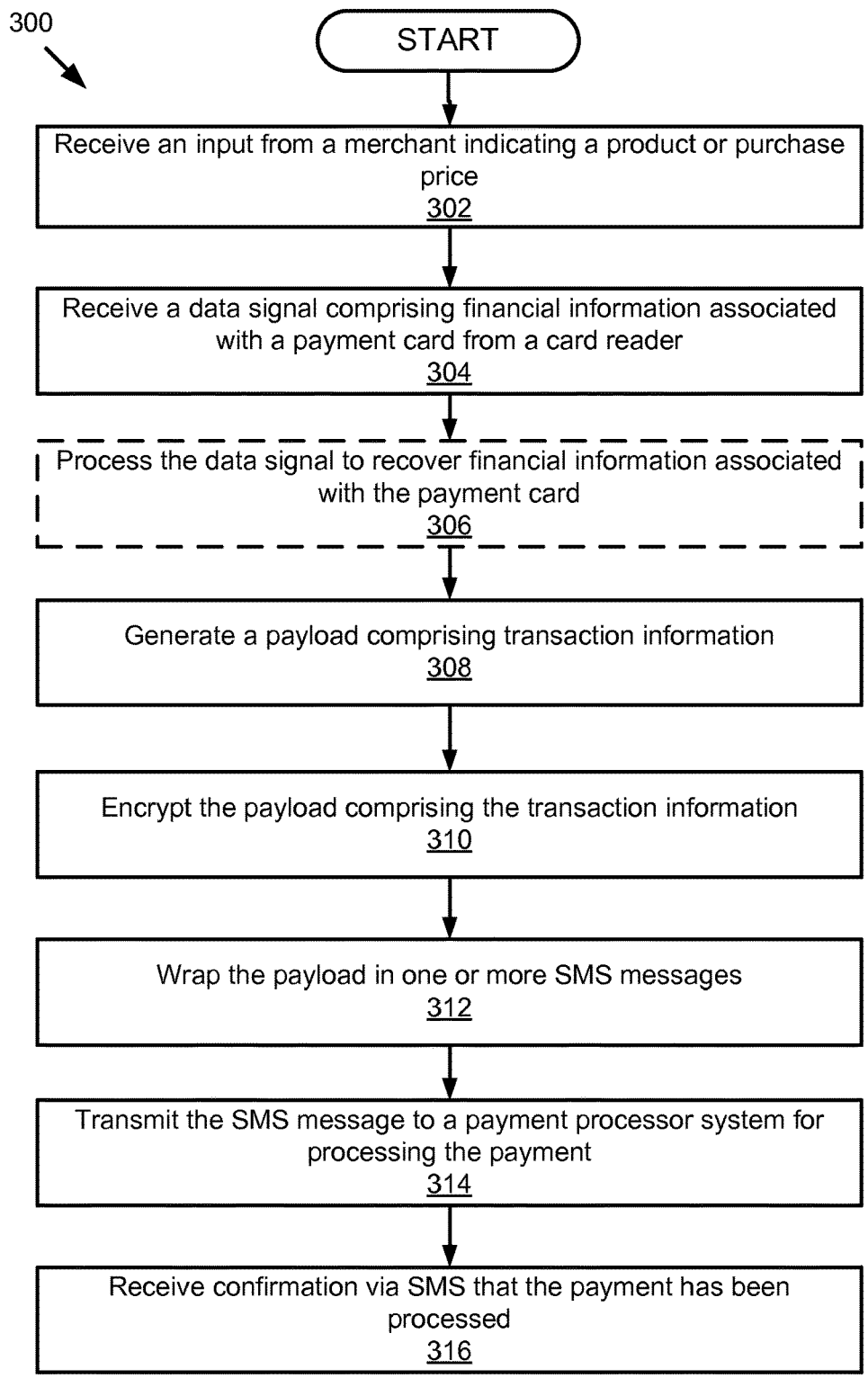
FIG. 3 is a flow diagram of an example process for communicating transaction information via SMS.
Figure 4:
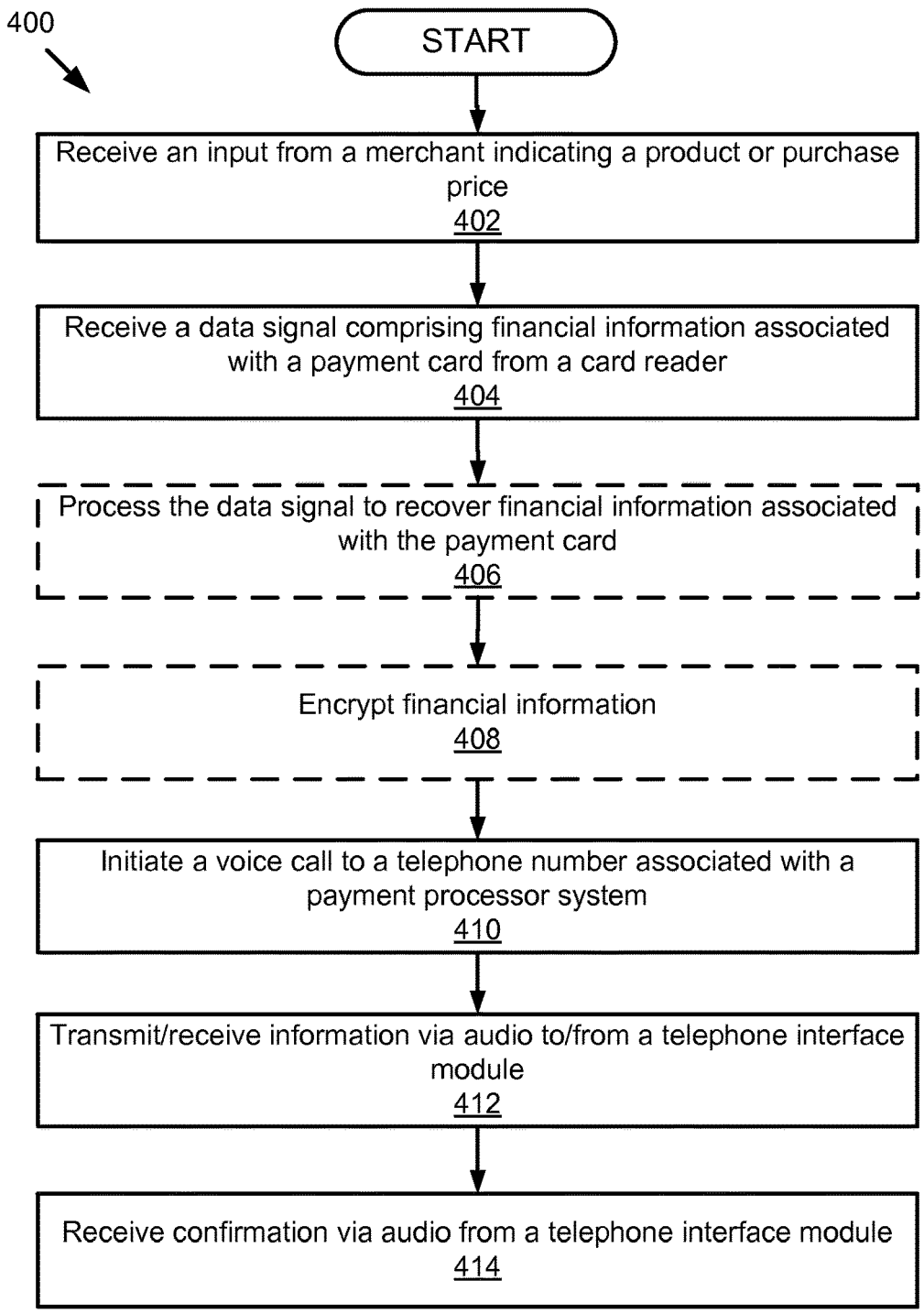
FIG. 4 is a flow diagram of an example process for communicating transaction information via a voice call.

The processes described in FIGS. 2, 3, and 4 are each illustrated as a collection of blocks in logical flow diagrams, which represent a sequence of operations, some or all of which can be implemented in hardware, software, or a combination thereof. The order in which the blocks are described should not be construed as a limitation. Any number of the described blocks can be combined in any order and/or in parallel to implement the processes, or alternative processes, and not all of the blocks need be executed. For ease of description, the processes are described with reference to the environments, architectures and systems described in the examples herein, although the processes may be implemented in a wide variety of other environments, architectures and systems.

FIG. 2 is a flow diagram of one embodiment of an example process 200 for selecting an appropriate means of communication between a merchant device 110 and a payment processor system 112. At 202, the merchant application 116 receives, via the merchant device 110, an input from a merchant 102 indicating a product, purchase price, or other transaction information. For example, in some embodiments, the merchant application 116 may present an interface with data input fields to the merchant 102 for display on the merchant device 110. The data input fields allow the merchant 102 to enter transaction information for the particular POS transaction, such as a dollar amount of the transaction, a sales-tax rate, an item description, a note, etc. The data input fields may optionally allow the merchant 102 to select one or more items or transaction amounts for frequently used or previously entered items or transactions.

At 204, the merchant application 116 receives, via the merchant device 110, financial information associated with a payment card from a card reader. The merchant application 116 may be configured to receive information from a card reader, which, in one embodiment, may be attached to the merchant device 110 via an audio input port. In other embodiments, the payment card reader may be coupled with the merchant device 110 by other physical connectors, standardized or proprietary. In yet other embodiments, the payment card reader may be communicatively coupled with the merchant device 110 without a physical connection by a low power wireless communication interface (e.g., Bluetooth, Bluetooth Low Energy, Zigbee, or the like). The card reader is configured with a payment card interface to accept financial information from a payment card. The card reader may be a conventional magnetic stripe reader, EMV chip reader, near field communications (NFC) reader, or other suitable type of card interface, or combination of such interfaces. In some embodiments, the card reader may read payment card information from a smart phone configured with NFC or similar technology. In some embodiments, the merchant application 116 may also allow the merchant 102 to manually enter financial information associated with a payment card on the merchant device 110, for example when a payment card fails to be properly read by the card reader.

At 208, the merchant application 116 determines whether an internet connection is available via network 114 to transmit the financial information to the payment processor system 112. In some embodiments, the merchant device 110 monitors whether an internet connection is available and provides an internet connection status to the merchant application 116. In some embodiments, the merchant application 116 may ping an IP address (e.g. by sending internet Control Message Protocol echo request packets to a target host), such as an IP address for the payment processor system 112, to determine whether an internet connection is available. In other embodiments, the merchant device 110 and/or merchant application 116 may use other known methods to determine whether an internet connection is available. There may be various reasons why an internet connection is not available to the merchant device 110 and/or merchant application 116. For example, an internet connection may not be available to the merchant device 110 and/or merchant application 116 due to a poor signal or lack of data service from a wireless service provider. In some instances, an internet connection may not be available because the merchant application 116 lacks permission on the merchant device 110 to access the data network 114. In some embodiments, the merchant application 116 may allow the merchant 102 to select an option to prevent the merchant application 116 from accessing the internet. For example, the merchant 102 may select an option to prevent the merchant application from communicating via the internet once a threshold of data usage (e.g. the quantity of data communicated by the merchant device 110 on the data network 114) has been reached in order to prevent additional network costs to the merchant 102.

At 210, the merchant application 116 transmits transaction information via the internet connection in response to a determination at 208 that an internet connection is available. As discussed herein, prior to communicating the transaction information via the data network 114, the transaction information may be encrypted for security. As used herein, transaction information means information used by the payment processor system 112 to complete a POS transaction. For example, transaction information may include financial information from the payment card, merchant identification information, a transaction amount (e.g. in dollars), information entered by the merchant 116 in the merchant device 110, or other information related to the POS transaction.

At 212, in response to determining that an internet connection is not available at 208, the merchant application 116 transmits the transaction information to the payment processor system 112 using a non-internet communication channel. For example, the non-internet communication channel may be an SMS messaging or a voice call via voice network 130. In some embodiments, prior to transmitting the transaction information via the non-internet communication channel, the merchant application 116 requests approval from the merchant 102 to send the transaction information via the non-internet communication channel. In some embodiments, the merchant application 116 may automatically send the transaction information via the non-internet communication channel when an internet connection is not available.

In some embodiments, the merchant application 116 may provide the merchant 102 with options to automatically communicate the transaction information via the non-internet communication channel (e.g., SMS message, MMS message, voice call, etc.) or to store the information for communication via the internet at a later time. For example, if an internet connection is not available, the merchant 102 may prefer to use a voice call instead of an SMS message to communicate the transaction information to the payment processor system, the merchant application 116 provides an option for the merchant to select a setting to automatically communicate the transaction information via a voice call. The process for communicating the transaction information via voice call is described in more detail below with reference to FIG. 4. In one embodiment, the merchant application 116 may provide settings to allow the merchant 102 to choose an order of communication channels to use for communicating the transaction information.

In some embodiments, the merchant 102 may select a setting that the merchant application 116 determines and uses the best available connection to transmit the transaction information. For example, the merchant application 116 may receive a status of the voice network 130 from the merchant device 110 indicating that cellular connection to the voice network 130 is poor, in response to which the merchant application 116 may determine to send the transaction information via SMS. The process for transmitting the transaction information using SMS messages is described in more detail below with reference to FIG. 3. Alternatively, the merchant application 116 may send the transaction information via MMS.

FIG. 3 is a flow diagram of one embodiment of an example process 300 for communicating transaction information via SMS. Although FIG. 3 is expressed in terms of an SMS message, the merchant application 116 could follow a similar process to transmit the transaction information via MMS or any other suitable messaging service available to the merchant application 116.

At 302, the merchant application 116 receives, via the merchant device 110, an input from a merchant 102 indicating a product, purchase price, or other transaction information as described above with reference to 202 in FIG. 2. At 304, the merchant application 116 receives, via the merchant device 110, financial information associated with a payment card as described above with reference to 204 in FIG. 2.

At 306, the merchant application 116 may optionally process the financial information received from the payment card reader. For example, in the embodiment where the payment card reader is coupled with the merchant device 110 via an audio port, the merchant application 116 processes the audio signal (e.g., demodulates and/or decrypts the signal) to recover financial information associated with the payment card transmitted on the audio signal. In other embodiments, other signal processing techniques may be employed to recover payment information from a signal transmitted to the merchant application 116 via methods other than an audio signal.

At 308, the merchant application 116 generates a payload of transaction information, including the recovered financial information, for transmission to the payment processor system 112. The payload of transaction information may include the recovered financial information, other transaction information, and/or other data for communication between the merchant application 116 and the payment processor system 112. In some embodiments, the merchant application 116 may encode the information for the payload in one or more segments of suitable size for transmission via SMS. In some embodiments, the information may be compressed according to known compression algorithms to be fit within a payload of suitable size for transmission via SMS. In some embodiments, the merchant application 116 may encode the information for the payload as media, such as an image, audio file, video, or other format which may be transmitted via SMS or MMS. For example, the merchant application 116 may receive financial information associated with a payment card from the card reader, encode the financial information and other transaction information as an image, and transmit the image via MMS.

At 310, the merchant application 116 encrypts the payload of transaction information to provide data security for storage or transmission of the payload of transaction information to the payment processor system 112. Any suitable standardized or proprietary encryption technique may be used for encryption and/or decryption of the payload of transaction information. For example, the merchant application 116 may encrypt and decrypt the payload using symmetric-key or public-key cryptography.

At 312, the merchant application 116 wraps one or more payloads of transaction information in one or more SMS messages. For example, the merchant application 116 may be configured to add a header and/or other information to the payload for routing and handling of the SMS message. In some embodiments, if the payload of transaction information comprises more than one segment, header information may be included in the header for each segment to give the multiple messages context so that the serial messages may be properly reconstructed. In some embodiments, the merchant application 116 may be configured to prepare and send SMS messages containing the payload from the application itself without using a separate third-party SMS messaging application on a merchant device 110. In some embodiments, the merchant application 116 may send the payload to a separate messaging application on the merchant device 110 along with destination information for the messaging application to prepare and send the SMS containing the payload of transaction information. In one embodiment, the messaging application may prompt the merchant 102 for authorization to send the SMS message.

At 314, the merchant device 110 transmits the SMS message (or series of messages) via the voice network 130 to the payment processor system 112 for processing the payment. The payment processor system 112 may receive the SMS message using a telephone interface module 128 as described in more detail herein.

At 316, the merchant application 116 may receive confirmation via SMS that the payment has been processed. Confirmation that the payment has been processed may include an indication that the payment has been accepted, denied, or that the payment failed for some other reason. In some embodiments, the merchant application 116 may be configured to receive an SMS or MMS message, process encoded information contained within the received message and present the confirmation to the merchant 102. For example, the merchant application 116 may intercept an SMS message from the payment processor system 112 containing encoded information indicating payment status, process the encoded information, and present the payment status to the merchant 102. The merchant application 116 may be capable of recognizing relevant received messages based on the source of the messages, some text within the message, or similar methods.

In some embodiments, the merchant application 116 may not receive an SMS or MMS message from the payment processor system 112 indicating payment status, but may allow a separate third-party messaging application on the merchant device 110 to receive the message and display it to the merchant 102. For example, due to a merchant preference indicating that the merchant application 116 should not have access to incoming messages, the process 300 may allow a third-party messaging application on the merchant device 110 to display messages from the payment processor system 112. In some embodiments, the merchant application 116 may, in advance or at the time of transmission of the transaction information, communicate a merchant's preference to receive messages on a third-party messaging application, so that the payment processor system 112 sends the message(s) in a format comprehensible by the merchant 102.

FIG. 4 is a flow diagram of one embodiment of an example process 400 for communicating transaction information via a voice call. At 402, the merchant application 116 receives, via the merchant device 110, an input from a merchant 102 indicating a product, purchase price, or other transaction information as described above with reference to 202 in FIG. 2. At 404, the merchant application 116 receives, via the merchant device 110, financial information associated with a payment card as described above with reference to 204 in FIG. 2.

At 406, the merchant application 116 may optionally process the financial information associated with the payment card. For example, in some embodiments, the payment card reader may transmit the financial information to the merchant application in a format not suitable for transmission as an audio signal. The merchant application 116 may therefore process the financial information into a format suitable for transmission as an audio signal over a voice call. In some embodiments, additional processing may be performed by the merchant application 116 to increase reliability of the audio signal transmission (e.g., amplification, noise reduction, etc.). In some embodiments, the merchant application 116 may generate an audio signal comprising transaction information, including the financial information from the payment card, the POS transaction information input by the merchant at 402, etc., for transmission to the payment processor system 112. At 408, the merchant application 116 may optionally encrypt the financial information received from the card reader to provide data security as the financial information is transmitted via the voice network 130.

However, in some embodiments, the process 400 may bypass these optional actions (i.e., 406 and 408). For example, in embodiments where the payment card reader transmits the financial information over the audio port of the merchant device 116 as an audio signal, the merchant application 116 may transmit the audio signal received from the payment card reader directly over the voice network 130. Additionally, the card reader may encrypt the financial information associated with a payment card and transmit it as an encrypted audio signal via an audio port of the merchant device 110 and therefore the merchant application 116 can transmit the audio without additional encryption. In some embodiments, the merchant application may further add an additional layer of encryption on the audio signal to provide additional security.

At 410, the merchant application 116 initiates a voice call to a telephone number associated with the payment processor system 112. The payment processor system 112 may include a telephone interface module 128, as described above, to communicate with the merchant application via a voice network 130. In one embodiment, the merchant application 116 may be configured to automatically initiate a voice call without requesting additional input from the merchant 102. The voice call may take place in the background and be transparent to the merchant 102. However, in some embodiments, the merchant application 116 may request approval from the merchant 102 prior to making the voice call. In some embodiments, the merchant application 116 may direct the merchant 102 to dial a phone number associated with the payment processor system 112. For example, the merchant application 116, upon determining that transaction information should be transmitted via a voice call (e.g., if an internet connection is unavailable), may present a prompt to the merchant 102 to dial a phone number on a dialer presented in the merchant application 116 or on the merchant device 110. In some embodiments, the merchant application 116 may present an option to the merchant 102 to cause the merchant device 110 to initiate a voice call to the telephone number associated with the payment processor system 112 without additional input from the merchant 102. For example, after determining that the transaction information should be transmitted via a voice call, the merchant application 116 may present the phone number associated with the payment processor system 112 to the merchant 102 as a link or button which may be selected causing the phone number to be dialed or copied to the dialing screen on the merchant device 110.

At 412, the merchant application 116 transmits the financial information as an audio signal to the telephone interface module 128 of the payment processor system 112. As described above, the audio signal may be in the form of words, audio tones, or other suitable audio signals. In some embodiments, the merchant application 116 may automatically transmit the audio signal to the payment processor system 112 upon initiating a voice call. In some embodiments, the merchant application 116 may be capable of bilateral communication via audio signal with the payment processor system 112. For example, after establishing a voice call, the payment processor system 112 may send an audio signal to the merchant application 116 indicating that the payment processor system 112 is ready to receive the transaction information, in response to which, the merchant application 116 may transmit an audio signal comprising the transaction information to the payment processor system 112.

At 414, the merchant application 116 may receive information via audio from a telephone interface module 128 of the payment processor system 112. The information may be communicated to the merchant 102 or used by the merchant application 116 in processing the POS transaction. Information that may be received from the payment processor system 112 includes, but is not limited to, instructions regarding whether to re-swipe the payment card, instructions for completing the transaction such as to enter payment amount, merchant information, or other transaction information, and payment status such as whether the payment has been accepted, denied or failed. As described above, the merchant application 116 may be capable of receiving and processing audio information from the payment processor system 112 and presenting the information to the merchant 102. In some embodiments, the merchant application 116 may receive audio information and present it visually or as an audible signal to the merchant 102. In some embodiments, the card reader may include a speaker, a screen, or lights indicating to a merchant 102 the payment status. In some embodiments, the card reader may, via a speaker, screen, or lights indicate to the merchant 102 that the card should be swiped. The card reader may also indicate to the merchant 102 that the payment has been accepted, denied, or failed.

In some embodiments, the merchant application 116 may not be present on the merchant device 110, as described above in reference to FIG. 1. A merchant device 110 may not include an instance of the merchant application 116, for example, when the merchant device 110 does not support the merchant application 116 or the merchant 102 does not desire to install the merchant application 116 on the merchant device 110. Additionally, the merchant application 116 may be present on the merchant device 110, but not functional. For example, the merchant application 116 may have malfunctioned or is otherwise inoperable and is not able to complete the point-of-sale transaction. In some embodiments, the payment processor system 112 (including telephone interface module 128 and payment processing module 126) communicates with the merchant device 110 via a voice call to allow POS payments to be made even when no merchant application 116 is present on the merchant device 110.

Figure 5:
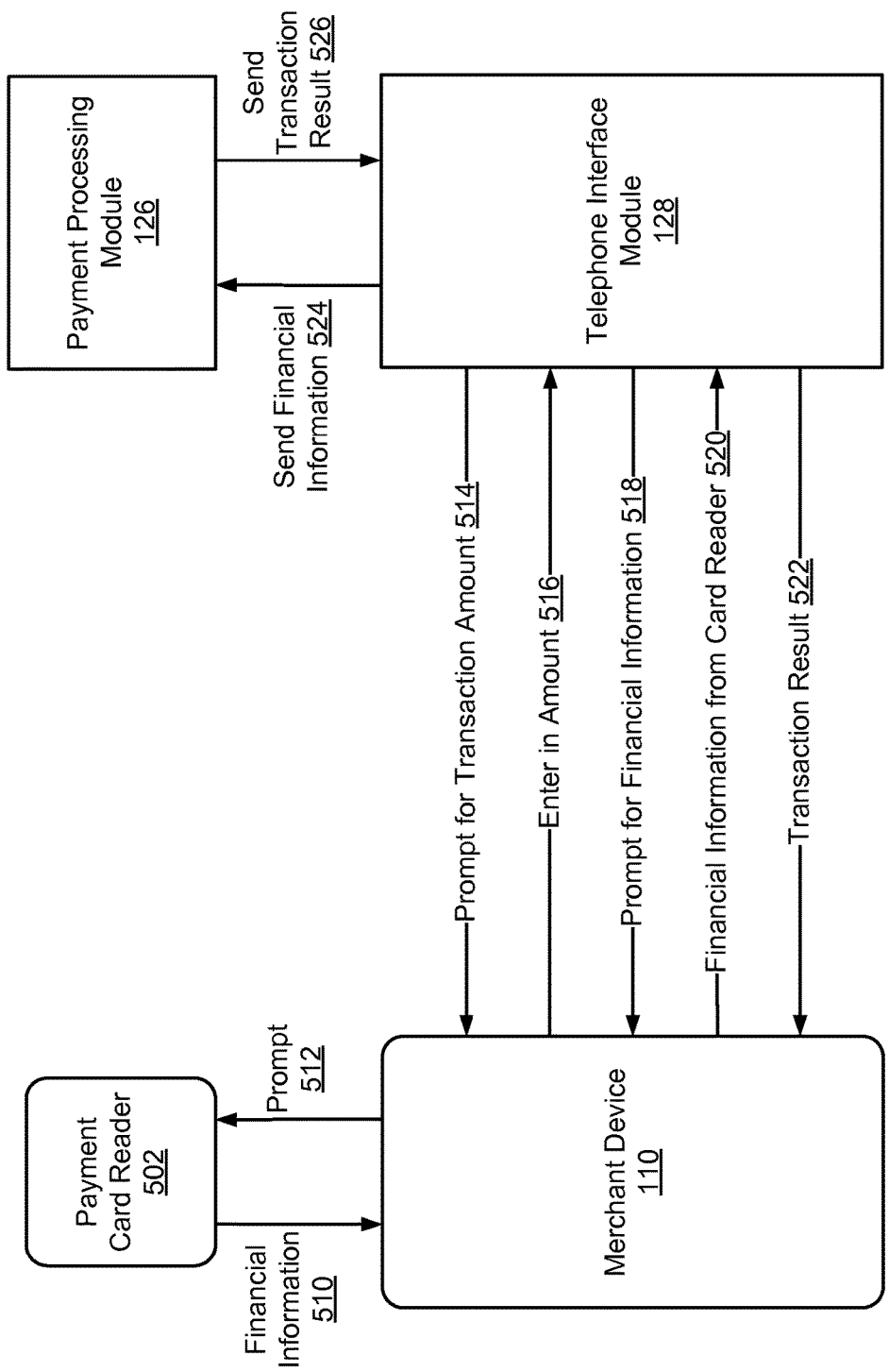
FIG. 5 illustrates an example signal diagram showing communication between a merchant device and a payment processing system in the absence of a merchant application on the merchant device.

FIG. 5 illustrates an example signal diagram showing communication between the payment card reader 502, the merchant device 110, and the payment processing module 126 in the absence of a merchant application 116 on the merchant device 110. Although FIG. 5 is described in terms of certain examples and embodiments, it should be understood that these are not meant to be limiting and that other embodiments are contemplated.

To complete the POS payment, the merchant 102 initiates a voice call with the telephone interface module 128 of the payment processor system 112. For example, the merchant dials a telephone number provided by the payment processor to connect with the telephone interface module 128 of the payment processor system 112. The merchant 102 may then communicate POS transaction information with the payment processing system using audio signals. For example, the telephone interface module 128 may be configured to guide the merchant 102 through the POS payment process using voice prompts via the input/output mechanisms of the merchant device 110. In other embodiments, the payment processor system 112 communicates with the merchant 102 via the card reader 502. In some embodiments, for example, when the merchant 102 initiates a voice call with the telephone interface module 128 while the card reader is connected to an audio port of the merchant device 110, the merchant device 110 may not be capable of playing the audio instructions from the telephone interface module 128. In these situations, the payment card reader 502 receives prompts 512 through the audio port and conveys them to the merchant 102 via a speaker, screen (such as an LCD, OLED, etc.), or lights built in to the payment card reader 502. Additionally, the merchant 102 may be identified by the payment processor system 112 by the number from which the merchant is calling, or some other merchant identification information included to connect the voice call.

In some embodiments, once a voice call has been established, the telephone interface module 128 prompts the merchant 102 to enter a transaction amount at 514. At 516, the merchant 102 enters the transaction amount which is transmitted via the voice call to the telephone interface module 128. For example, the merchant 102 could enter the transaction amount on a keypad on the merchant device 110 to be transmitted via a touch-tone on the voice call. In another example, the telephone interface module 128 is configured to recognize vocal cues and information spoken by the merchant 102.

At 516, the telephone interface module 128 prompts the merchant 102 for financial information. At 520, in response to the prompt at 518, the merchant 102 or buyer 104 swipes or dips a payment card, or communicates financial information by some other means, to the payment card reader 502, which sends the financial information in an audio signal via the voice call to the telephone interface module 128. In some embodiments, the payment card reader 502 or merchant device 110 may receive the financial information prior to the prompt, store the financial information for later transmission, and transmit the financial information in response to a prompt. The telephone interface module 128 receives the financial information from the merchant device 110 and converts it into a digital signal. In some embodiments, the payment card reader 502 encrypts the financial information prior to communicating it through an audio signal at 510, and the telephone interface module 128 decrypts the financial information.

At 524, the telephone interface module 128 sends financial information, and other transaction information, to the payment processing module 126 for processing. The payment processing module 126 processes the payment and sends a transaction result, at 526, back to the telephone interface 128. A transaction result indicates the status of the payment to the merchant 102. For example, the transaction result may include an indication that the payment was accepted, denied, or failed for some other reason. The telephone interface module 128 transmits the transaction result to the merchant device 110 via the voice call at 522. In some embodiments, the transaction result may include instructions to re-swipe the payment card, in which circumstance the process may start over at 514 or 518.

Figure 6:
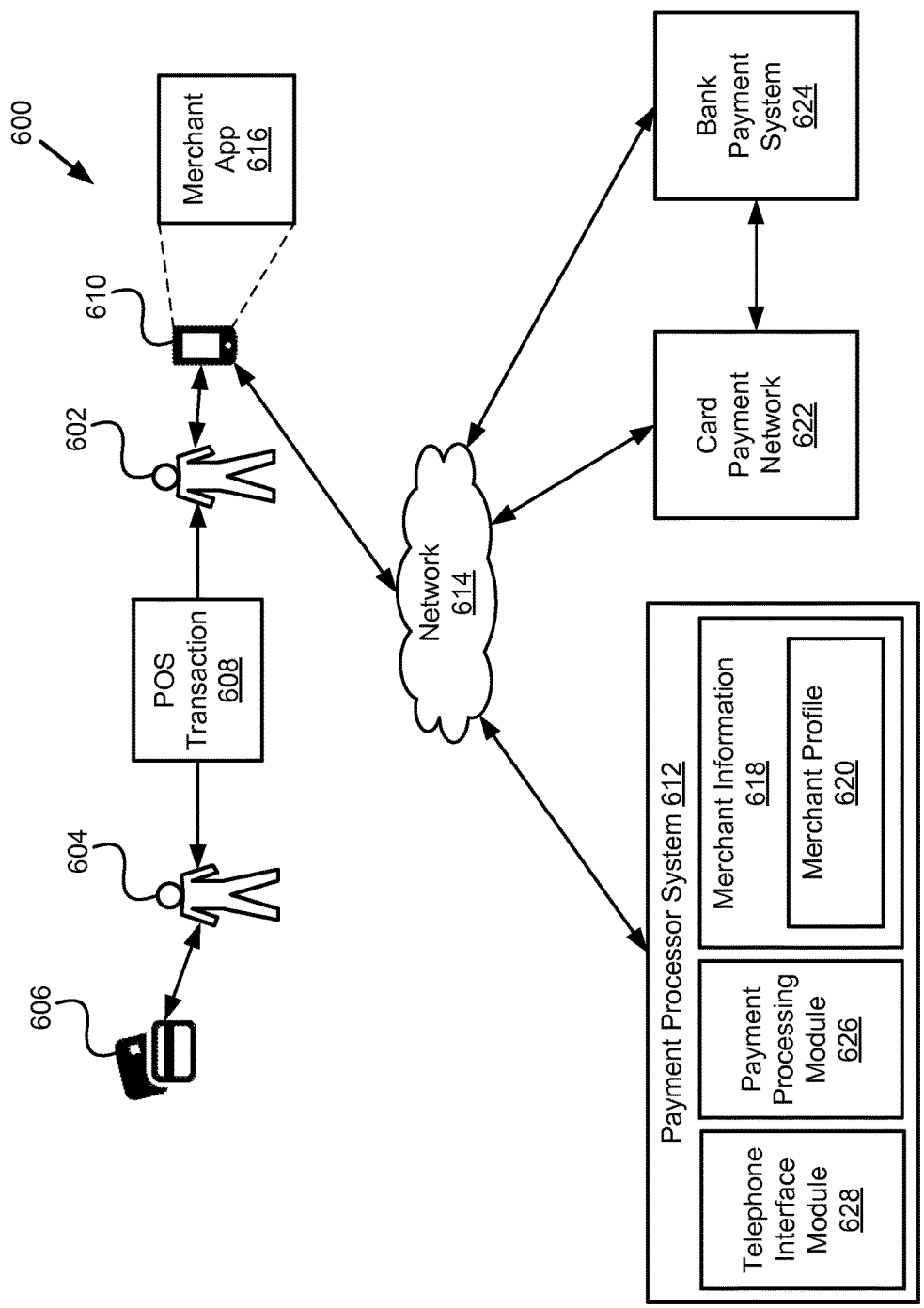
FIG. 6 illustrates an example architecture of a payment communication system for enabling transactions between merchants and buyers.

FIG. 6 illustrates an example architecture of a payment communication system 600 for enabling transactions between merchants 602 and buyers 604. In the example of FIG. 6, a buyer 604 may use any of a variety of payment cards 606 when participating in a POS transaction 608 with a merchant 602. For example, a buyer 604 may typically have payment cards 606 such as credit cards, debit cards, prepaid cards, and the like, that the buyer 604 may use for conducting POS transaction 608. In some embodiments, the payment cards 606 may include one or more magnetic strips for providing payment card and buyer information when swiped in a card reader 100. In other embodiments, other types of payment cards may be used, for example smart cards having a built in integrated circuit including a memory chip, a radio frequency identification tag, and the like.

The payment communication system 600 in the example of FIG. 6 illustrates a merchant device 610 associated with the merchant 602 that participates in the payment service provided by the service provider of the payment processor system 612. As discussed elsewhere herein, the merchant device 610 may be a computing device (e.g., a mobile computing device) able to communicate with the payment processor system 612, and with various other computing devices, through any suitable communication protocols, interfaces, and networks, including network 614. Further, the merchant device 610 may be any appropriate device operable to send and receive requests, messages, or other types of information over the network 614. Additionally, while only a single merchant device 610 is illustrated in the example of FIG. 6, in some implementations there may be additional merchant devices depending on the number of merchants participating in the payment service.

Each merchant device 610 may include an instance of a merchant application 616 executed on the merchant device. The merchant application 616 may provide POS functionality to enable the merchant 602 to accept payments at a POS location using the merchant device 610. In some embodiments, as described herein, the merchant device 610 may operate to provide POS functionality without a merchant application 616. In some types of businesses, the POS location may correspond to a store or other place of business of the merchant, and thus, may be a fixed location that typically does not change on a day-to-day basis. In other types of businesses, however, the POS location may change from time to time, such as in the case that the merchant 602 operates a food truck, is a street vendor, a cab driver, or has an otherwise mobile business, e.g., in the case of merchants who sell items at buyers' homes, buyers' places of business, and so forth.

Accordingly, the merchant 602 and the buyer 604 may conduct a POS transaction 608 by which the buyer 604 acquires an item or service from the merchant 602 at a POS location. The merchant application 616 on the merchant device 610 may send transaction information to the payment processor system 612, e.g., as the transaction is being conducted at the POS location. In some embodiments, such as if a particular merchant device 610 is not connected to the network 614 and is therefore processing transactions offline, the transaction information may be sent in a batch at a subsequent point in time or using other suitable techniques. In some embodiments, the transaction information may be sent via SMS, MMS, or a voice call as described elsewhere herein.

The transaction information may include information regarding the time, place, and the amount of each respective transaction, information related to the item acquired, payment card information, as well as additional information, such as buyer information. For instance, the transaction information can include data stored in the payment card, e.g., magnetic stripe or integrated circuit data (cardholder name, card number, and other card information). In addition, when completing the transaction a buyer may sometimes provide a receipt email address for receiving a receipt through email. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), any type of data that is received upon a buyer's authentication into a social network, if any, and various other types of information.

To accept electronic payments for POS transactions, the merchant 602 typically creates a merchant account on the payment processor system 612 by providing information describing the merchant including, for example, merchant name, contact information (e.g., telephone numbers, the merchant's address, and one or more financial accounts to which funds collected from buyers will be deposited). This merchant information can be securely stored by the service provider, for example, as merchant information 618 in a secure database. Further, the merchant information may include a merchant profile 620 created for each merchant. The merchant profile 620 may include information about the merchant 602 and transaction information associated with transactions conducted by the merchant.

The payment processor system 612 enables a service provider to provide a payment service in which merchants 602 are able to conduct POS transactions 608 with a plurality of buyers 604, such as for selling services and/or products to the buyers 604. The payment processor system 612 may include one or more servers that are configured to process secure electronic financial transactions, e.g., payment during a POS transaction 608, by communicating with the merchant device 610, card payment networks 622, and bank or other financial institution payment systems 624. The payment processor system 612 includes a payment processing module 626 that receives transaction information for processing payments made through the merchant application 616. For example, the payment processing module 626 may receive transaction information, such as an amount of the transaction, and may verify that a particular payment card 606 can be used to pay for the transaction, such as by contacting a card clearinghouse of a card payment network 622. Furthermore, in some examples, the payment processing module 626 may redirect payment information for transactions to be made using payment cards 606 to a bank, or other financial institution, payment system 624. In other embodiments, the merchant device 610 may communicate directly with an appropriate card payment network 622 or bank payment system 624 for approving or denying a transaction using a particular payment card 606 for a POS transaction 608. Additional details of payment processing are discussed below.

The payment processor system 612 includes a telephone interface module 628 to facilitate communicates with a merchant device 610 via the network 614. For example, the telephone interface module 628 may provide a telephone connection to the merchant device 610 for receiving transaction information via a voice call, SMS, MMS, or other telecommunication service. The telephone interface module 628 is described in more detail herein with reference to FIG. 8.

As introduced above, the payment processor system 612 may be configured to communicate with one or more systems of a card payment network 622 (e.g., MasterCard®, VISA®, or the like) over the network 614 to conduct financial transactions electronically. The payment processor system 612 may also communicate with one or more bank payment systems 624 of one or more banks over the network 614. For example, the payment processor system 612 may communicate with an acquiring bank, a payment card issuing bank, and/or a bank maintaining buyer accounts for electronic payments.

A payment card acquiring bank may be a registered member of a card association (e.g., Visa®, MasterCard®, or the like), and may be part of a card payment network 622. A payment card issuing bank may issue payment cards 606 to buyers 604, and may pay acquiring banks for purchases made by cardholders to which the issuing bank has issued a payment card 606. Accordingly, in some embodiments, the systems of an acquiring bank may be included in the card payment network 622 and may communicate with systems of a payment card issuing bank to obtain payment. Further, in some embodiments, bank payment systems 624 may include systems associated with debit card issuing institutions, in which case, the systems of the debit card issuing institution may receive communications regarding a transaction in which the buyer uses a debit card instead of a credit card. Additionally, there may be systems of other financial institutions involved in some types of transactions or in alternative system architectures, and thus, the foregoing are merely several examples.

The network 614 can be a conventional type, wired or wireless, and may have numerous different configurations including a star configuration, token ring configuration, or other configurations. Furthermore, the network 614 may include a local area network (LAN), a wide area network (WAN) (e.g., the internet), and/or other interconnected data paths across which multiple devices may communicate. In some embodiments, the network 614 may be a peer-to-peer network. The network 614 may also be coupled with or include portions of a telecommunications network for sending data using a variety of different communication protocols. In some embodiments, the network 614 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 6 illustrates one network 614 coupled to the merchant device, payment processor system, card payment network, and bank, in practice one or more networks 614 can connect these entities. For example, as described above, the merchant device 610 may be connected to both a data network 114 and a voice network 130 and may communicate with the payment processor system 612 via either network.

Figure 7:
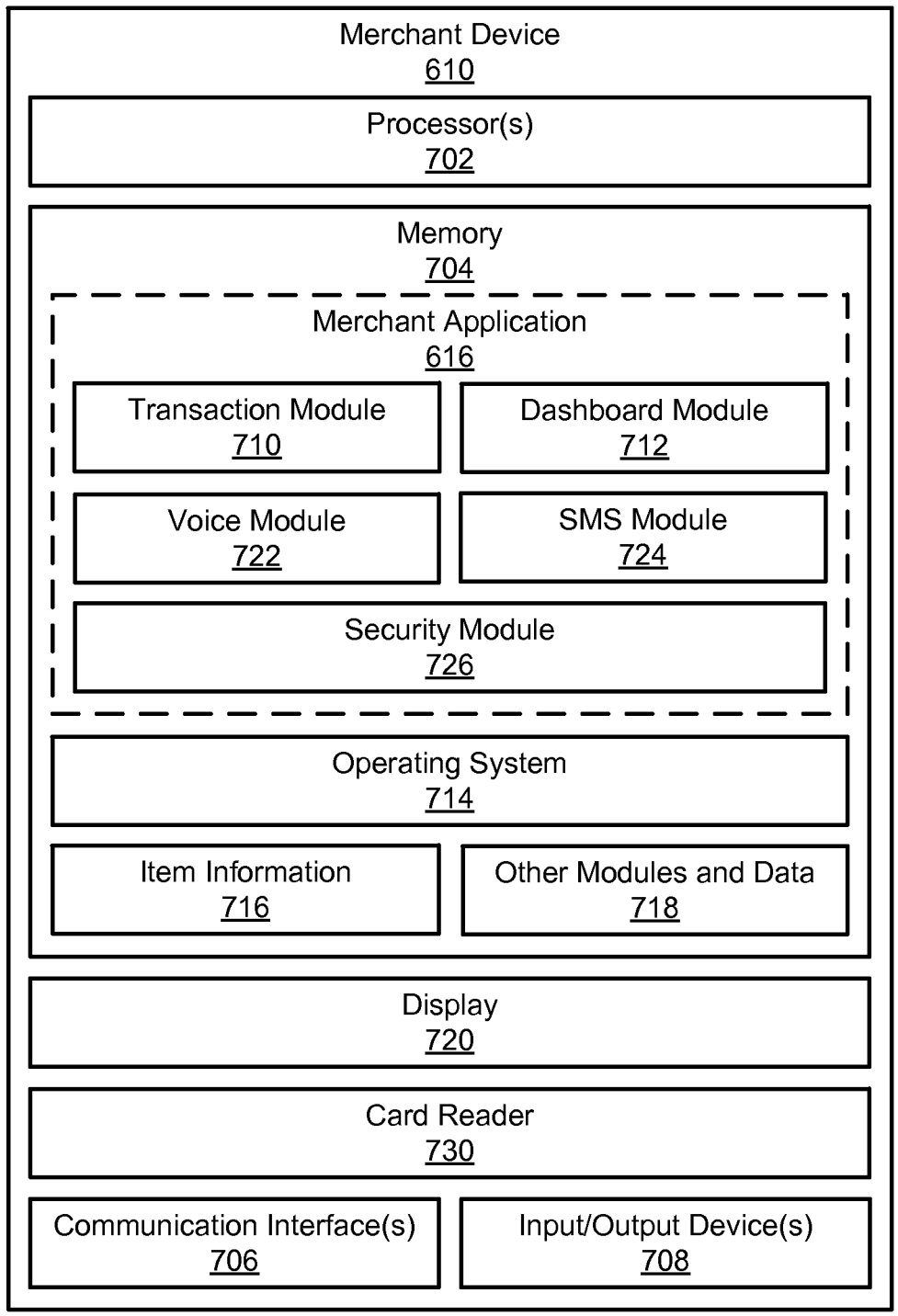
FIG. 7 illustrates an example block diagram of components of a merchant device.

FIG. 7 is a block diagram illustrating select components of an example merchant device 610 according to some embodiments. The merchant device 610 may be any suitable type of computing device, e.g., portable, semi-portable, semi-stationary, or stationary. Some examples of the merchant device 610 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body mounted computing devices; augmented reality devices; or other computing devices capable of sending communications and performing the functions according to the techniques described herein.

In the example of FIG. 7, the merchant device 610 includes at least one processor 702, a memory 704, one or more communication interfaces 706, and one or more input/output (I/O) devices 708. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some embodiments, the processor 702 may be one or more hardware processors and/or logic circuits of any suitable type specifically programmed or configured to execute the algorithms and processes described herein by performing various input/output, logical, and/or mathematical operations. The processor 702 can be configured to fetch and execute computer-readable processor-executable instructions stored in the memory 704.

Depending on the configuration of the merchant device 610, the memory 704 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 704 may include, but is not limited to, RAM, ROM, EEPROM, flash memory, solid-state storage, magnetic disk storage, optical storage, and/or other computer-readable media technology. Further, in some cases, the merchant device 610 may access external storage, such as RAID storage systems, storage arrays, network attached storage, storage area networks, cloud storage, or any other medium that can be used to store information and that can be accessed by the processor 702 directly or through another computing device or network. Accordingly, the memory 704 may be computer storage media able to store instructions, modules or components that may be executed by the processor 702.

The memory 704 may be used to store and maintain any number of functional components or modules that are executable by the processor 702. In some embodiments, these functional components comprise instructions or programs that are executable by the processor 702 and that, when executed, implement operational logic for performing the actions and services attributed above to the merchant device 610. Functional components of the merchant device 610 stored in the memory 704 may include the merchant application 616. In this example, the merchant application 616 includes a transaction module 710, a dashboard module 712, a voice module 722, an SMS module 724, and a security module 726. The transaction module 710, for example, presents an interface, such as a payment interface to enable the merchant to conduct transactions, receive payments, and so forth, as well as for communicating with the payment processor system 612 for processing payments and sending transaction information. The dashboard module 712 enables the merchant to manage the merchant's account, the merchant profile, merchant preferences, view saved or new pricing information, and the like. The voice module 722 may, as described herein, enable the merchant application 616 to communicate transaction information with the payment processor system 612 via an audio signal. The SMS module 724 may, as described herein, enable the merchant application 616 to communicate with the payment processor system 612 via SMS, MMS, or another telephony messaging system. The security module 726 may, as described herein, enable the merchant application 616 to encrypt and decrypt transaction information communicated between the merchant device 610 and other system components. Additional functional components may include an operating system 714 for controlling and managing various functions of the merchant device 610 and for enabling basic user interactions with the merchant device 610.

In addition, the memory 704 may also store data, data structures and the like, that are used by the functional components. For example, data stored by the memory 704 may include item information 716 that includes information about the items offered by the merchant, which may include a list of items currently available from the merchant, images of the items, descriptions of the items, prices of the items, and so forth. For instance, when the merchant 602 is setting up the merchant application 616 to accept payments for particular items offered by the merchant 602, the merchant may enter the item information 716 for the particular items. Depending on the type of the merchant device 610, the memory 704 may also optionally include other functional components and data, such as other modules and data 718, which may include programs, drivers, etc., and the data used or generated by the functional components. Further, the merchant device 610 may include many other logical, programmatic and physical components, of which those described are merely examples that are related to the discussion herein.

The communication interface(s) 706 may include one or more interfaces and hardware components for enabling communication with various other devices, such as over the network(s) 614 or directly. For example, communication interface(s) 706 may enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 706 may include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 706 also provides other conventional connections to the network 614 for distribution of files and/or media objects using standard network protocols such as TCP/IP, HTTP, HTTPS and SMTP as will be understood.

The merchant device 610 may further include a display 720, which may employ any suitable display technology. For example, the display 720 may be a liquid crystal display, a plasma display, a light emitting diode display, an OLED (organic light-emitting diode) display, an electronic paper display, or any other suitable type of display able to present digital content thereon. In some embodiments, the display 720 may have a touch sensor associated with the display 720 to provide a touchscreen display configured to receive touch inputs for enabling interaction with a graphical user interface presented on the display 720. Accordingly, embodiments described herein are not limited to any particular display technology. Alternatively, in some embodiments, the merchant device 610 may not include the display 720, and information may be presented by other means, such as aurally.

The merchant device 610 may further include one or more I/O devices 708. The I/O devices 708 may include speakers, a microphone, a camera, and various user controls (e.g., buttons, a joystick, a keyboard, a keypad, etc.), a haptic output device, and so forth.

In addition, the merchant device 610 may include or may be connectable to a payment card reader 730. In some embodiments, the payment card reader 730 may plug in to a port in the merchant device, such as a microphone/headphone port, a data port, or other suitable port. The payment card reader 730 may include a card interface for reading a magnetic stripe or an integrated circuit of a payment card 606, and further may include encryption technology for encrypting the information read from the payment card 606. Alternatively, numerous other types of payment card readers 730 may be employed with the merchant devices 610 herein, depending on the type and configuration of the merchant device 610.

As used here, the term "payment card" refers to a payment mechanism which includes a debit card, a conventional credit card, "smartcards" that have embedded integrated circuit chips (e.g., Europay-MasterCard-Visa (EMV) cards), or any wallet-size card which functions as a combination of any of these payment mechanisms. In some embodiments, payment card may also include a virtual payment card stored on a device such as a smart phone or other device and transmittable, for example, via near field communication or other suitable means.

Other components included in the merchant device 610 may include various types of sensors (not shown), which may include a GPS device, an accelerometer, gyroscope, compass, proximity sensor, and the like. Additionally, the merchant device 610 may include various other components that are not shown, examples of which include removable storage, a power source, such as a battery and power control unit, and so forth.

Figure 8:
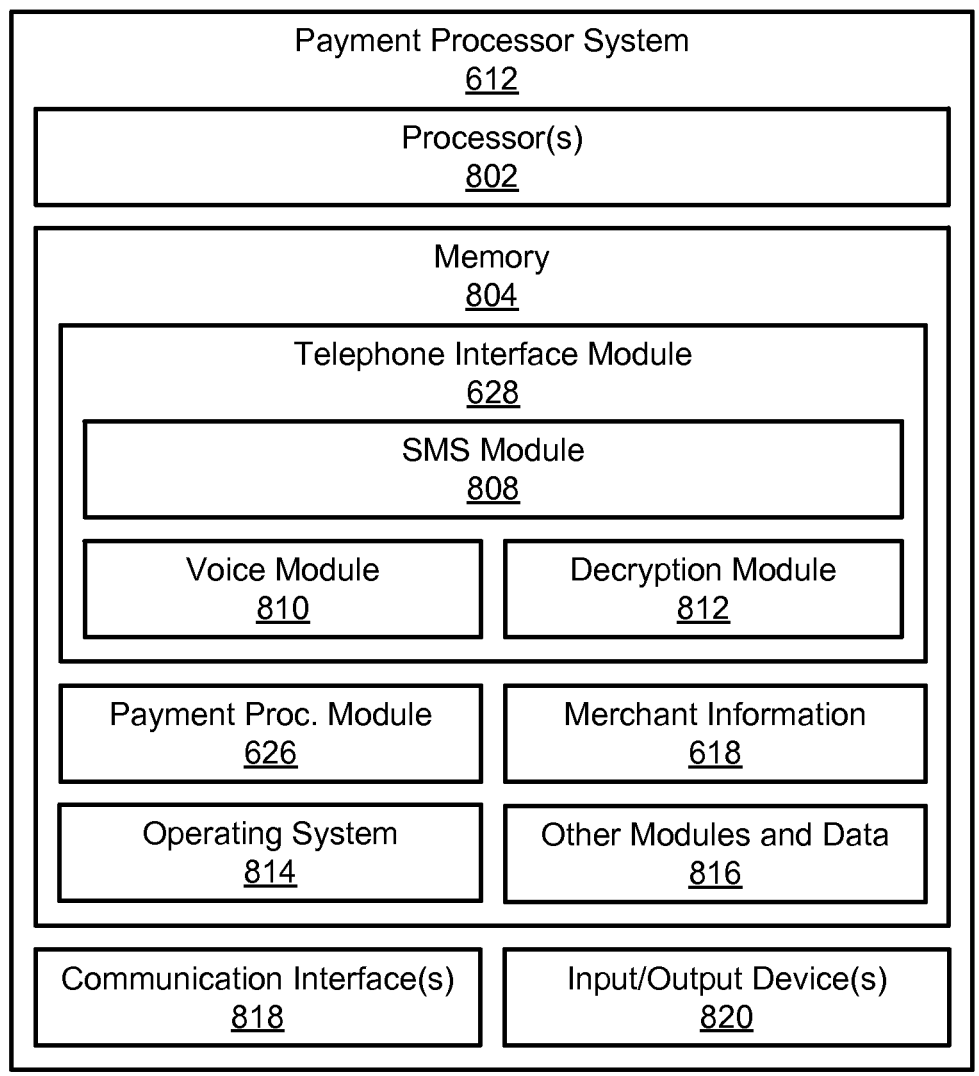
FIG. 8 illustrates an example block diagram of components of a telephone interface module.

FIG. 8 is a block diagram illustrating select components of an example payment processor system 612 according to some embodiments. The payment processor system 612 may be any suitable type of computing device capable of sending communications and performing the functions according to the techniques described herein and may be operated by a service provider that provides the payment service. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the examples herein illustrate the components and data of the payment processor system 612 as being present in a single location, these components and data may alternatively be distributed across different computing devices and different locations. Consequently, the functions may be implemented by one or more computing devices, with the various functionality described above distributed in various ways across the different computing devices, to collectively implement the payment processor system 612. Multiple payment processor systems 612 may be located together or separately, and organized, for example, as virtual servers, server banks and/or server farms. The described functionality may be provided by the servers of a single entity or enterprise, or may be provided by the servers and/or services of multiple different buyers or enterprises.

In the example of FIG. 8, the payment processor system 612 includes one or more processors 802, one or more memory devices 804, one or more communication interfaces 818, and one or more input/output devices 820. These components may be similar to those described above with reference to FIG. 7 and elsewhere herein.

The memory 804 may be used to store and maintain any number of functional components or modules that are executable by the processor 802. In some embodiments, these functional components comprise instructions or programs that are executable by the processor 802 and that, when executed, implement operational logic for performing the actions and services attributed above to the payment processor system 612. Functional components of the payment processor system 612 stored in the memory 804 may include the telephone interface module 628, the payment processing module 626, and other modules and data 816. These components may be similar to those describe above with reference to FIG. 7 and elsewhere herein. In example of FIG. 8, the telephone interface module 628 includes an SMS module 808, a voice module 810, and a security module 812.

The SMS module 808 may, as discussed herein, enable the telephone interface module 628 to communicate with a merchant device 610 via SMS, MMS, or other telecommunication messaging service. The voice module 810 may, as discussed herein, enable the telephone interface module 628 to communicate transaction information with a merchant device 610 via a voice call across the voice network 130. The security module 812 may, as discussed herein, enable the telephone interface module 628 to decrypt/encrypt information received from/sent to the merchant device 610. Additional functional components may include an operating system 814 for controlling and managing various functions of the payment processor system and for enabling basic user interactions with the payment processor system 612.

In addition, the memory 804 may store data used for performing the operations described herein. Thus, the memory 804 may store the merchant information 618, including the merchant profiles. Further, the payment processor system 612 may include many other logical, programmatic and physical components, of which those described above are merely examples that are related to the discussion herein.

As described above, in certain circumstances a merchant application 616 may not be present on the merchant device 610, so some of the functionality normally performed by the merchant application 616 may be performed by the payment processor system 612. This functionality may include that of the transaction module 710, the dashboard module 712, as well as communicating with a card reader 730, decrypting financial information received from the card reader, accepting input from the merchant 602, providing instructions to the merchant 602, and allowing the merchant 602 to manage the merchant's account and preferences. In some embodiments, this functionality may be performed by the telephone interface module 628, while in some embodiments it may be performed by the payment processing module 626.

A payment communication system using a payment card reader has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the techniques to the precise form disclosed. Many modifications and variations are possible in light of the above teaching. It is intended that the scope of the embodiments be limited not by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats. Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, known to those of ordinary skill in the art of computer programming. Additionally, the techniques are in no way limited to implementation in any specific programming language, or for any specific operating system or environment. Accordingly, the specification is intended to be illustrative, but not limiting, of the scope of the claims, which are set forth below.

What is claimed is:

1. A mobile point-of-sale (POS) terminal for processing a financial transaction between a buyer and a merchant, the POS terminal comprising:

a payment card reader comprising a card interface configured to receive a payment card comprising financial information associated with the buyer; and a mobile computing device coupled with the payment card reader, the mobile computing device comprising:

a display;

one or more processors; and a memory storing instructions, which when executed by the one or more processors, cause the one or more processors to:

run a first application, wherein the first application is configured to receive an input from the merchant indicating a product or a service for purchase by the buyer and receive payment card information from the payment card reader to facilitate a transfer of funds from the buyer to the merchant for the purchase;

perform an automatic communication failover protocol to enable transmission of payment card information from the mobile computing device to a payment card processor in an event that an internet communication channel is unavailable, the performing the automatic communication failover protocol comprising:

determining, by the first application or by a second application executing on the mobile computing device, whether the internet communication channel over which to transmit the payment card information to a payment card processor for processing is available or unavailable;

in response to determining that the internet communication channel is available, automatically transmitting the payment card information to the payment card processor via the internet communication channel;

in response to determining that the internet communication channel is unavailable, determining whether a text messaging service is available or unavailable;

in response to determining that the text messaging service is available, automatically transmitting the payment card information to a telephone interface module of the payment card processor via a text message; and in response to determining that the text messaging service is unavailable, automatically transmitting the payment card information to the telephone interface module of the payment card processor via a voice call;

receive an approval of the payment card information from the payment card processor; and present an indication of the approval on the display of the mobile computing device.

2. The mobile POS terminal of claim 1, wherein to automatically transmit the payment card information to the payment card processor via a text message, the instructions further cause the one or more processors to:

generate a payload including at least the payment card information;

wrap the payload in the message; and transmit the text message to a telephony endpoint associated with the payment card processor.

3. The mobile POS terminal of claim 1, wherein to automatically transmit the payment card information to the payment card processor via a voice call, the instructions further cause the one or more processors to:

receive an audio signal from the payment card reader, the audio signal comprising the payment card information;

initiate the voice call to a telephone number associated with the payment card processor; and transmit the audio signal comprising the payment card information to the payment card processor via the voice call.

4. A mobile point-of-sale (POS) system comprising:

a payment card reader comprising:

a card interface configured to receive a payment card comprising financial information associated with a buyer; and a connector coupled with the card interface for carrying information read by the payment card reader;

a mobile computing device coupled with the payment card reader, the mobile computing device comprising:

a port coupled with the connector of the payment card reader, the port and the connector creating a data channel for carrying the financial information from the payment card reader to the mobile computing device;

a display;

one or more processors; and a memory storing instructions, which when executed by the one or more processors, cause the one or more processors to:

perform an automatic communication failover protocol to enable transmission of payment card information from the mobile computing device to a payment card processor in an event that an internet communication channel is unavailable, the performing the automatic communication protocol comprising:

determining whether the internet communication channel is available or unavailable to transmit payment card information to a payment card processor for processing;

in response to determining that the internet communication channel is available, automatically transmitting the payment card information to the payment card processor via the internet communication channel;

in response to determining that the internet communication channel is unavailable, determining whether a text messaging service is available or unavailable;

in response to determining that the text messaging service is available, automatically transmitting the payment card information to a telephone interface module of the payment card processor via a text message; and in response to determining that the text messaging service is unavailable, automatically transmitting the payment card information to the telephone interface module of the payment card processor via a voice call;

receive a response from the payment card processor; and present an indication of the response on the display of the mobile computing device.

5. The system of claim 4, wherein to transmit the payment card information via a voice call, the instructions further cause the one or more processors to:

receive a signal comprising the payment card information;

initiate the voice call to a telephone number associated with the payment card processor; and transmit the signal comprising the payment card information to the payment card processor via the voice call.

6. The system of claim 4, wherein the internet communication channel is unavailable based on financial constraints specified by a user.

7. The system of claim 4, wherein the instructions cause the one or more processors to run a register application to facilitate a transfer of funds from the buyer to a merchant for a purchase.

8. The system of claim 4, wherein the response to the payment card information from the payment card processor is an approval of the payment card information.

9. A method comprising:

reading financial information associated with a buyer from a payment card using a card interface of a payment card reader of a mobile point-of-sale (POS) system comprising a mobile computing device having a display, a coupled payment card reader, one or more processors, and a memory storing instructions for the one or more processors execution of:

performing an automatic communication failover protocol to enable transmission of payment card information from the mobile computing device to a payment card processor wherein the failover protocol provisions the automatic determination of internet availability by one or more processors of a mobile computing device of the mobile POS system, the automatic determination of text messaging service availability by one or more processors of a mobile computing device of the mobile POS system, and the automatic transmission of payment card information to a telephone interface module of the payment card processor via a voice call;

wherein when it is determined that the internet communication channel is available, automatically transmitting the payment card information to the payment card processor via the internet communication channel, wherein when it is determined that the internet communication channel is unavailable, determining whether a text messaging service is available or unavailable;

in response to determining that the text messaging service is available, automatically transmitting the payment card information to a telephone interface module of the payment card processor via a text message; and wherein when it is determined that the text messaging service is unavailable, automatically transmitting the payment card information to the telephone interface module of the payment card processor via a voice call; and receiving an approval of the payment card information from the payment card processor.

10. The method of claim 9, wherein automatically transmitting the payment card information to the telephone interface module of the payment card processor via the voice call comprises:

receiving, by the one or more processors of the mobile computing device, a signal from the payment card reader, the signal comprising the payment card information;

initiating, by the one or more processors of the mobile computing device, the voice call to a telephone number associated with the payment card processor; and transmitting the signal comprising the payment card information to the payment card processor via the voice call.

11. The method of claim 9, wherein the internet communication channel is unavailable based on financial constraints specified by a user.

12. The method of claim 9, further comprising, running, by the one or more processors of the mobile computing device, a register application to facilitate a transfer of funds from the buyer to a merchant for a purchase.

13. The method of claim 9, further comprising, receiving a response to the payment card information from the payment card processor.

14. The mobile POS terminal of claim 1, wherein determining whether the internet communication channel is available or unavailable comprises at least one of monitoring, by the mobile computing device, whether an internet connection is available or pinging, by the mobile computing device, an IP address for the payment card processor.

15. The mobile POS terminal of claim 1, wherein the determining whether the internet communication channel is available or unavailable comprises determining by the mobile computing device without input from a remote device.

16. The mobile POS terminal of claim 1, wherein the first application is a register application.

17. The system of claim 4, wherein the determining whether the internet communication channel is available or unavailable comprises determining by the mobile computing device without input from a remote device.

18. The method of claim 9, wherein the determining whether the internet communication channel is available or unavailable comprises determining by the mobile computing device without input from a remote device.

19. The system of claim 4, wherein the connector is an audio connector, wherein the port is an audio port, and the data channel is an audio data channel.

20. The mobile POS terminal of claim 1, wherein the internet communication channel is unavailable based on financial constraints specified by a user.

* * * * *